United States Patent
Ren et al.

(10) Patent No.: US 12,155,512 B2
(45) Date of Patent: Nov. 26, 2024

(54) CONTROL CHANNEL DEMODULATION REFERENCE SIGNAL BUNDLING

(71) Applicant: QUALCOMM Incorporated, San Diego, CA (US)

(72) Inventors: Yuwei Ren, Beijing (CN); Huilin Xu, Temecula, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/593,994

(22) PCT Filed: Apr. 30, 2020

(86) PCT No.: PCT/CN2020/088214
§ 371 (c)(1),
(2) Date: Sep. 29, 2021

(87) PCT Pub. No.: WO2020/221338
PCT Pub. Date: Nov. 5, 2020

(65) Prior Publication Data
US 2022/0190988 A1    Jun. 16, 2022

(30) Foreign Application Priority Data
May 1, 2019  (WO) ............... PCT/CN2019/085394

(51) Int. Cl.
*H04L 27/26* (2006.01)
*H04L 5/00* (2006.01)
*H04W 48/12* (2009.01)

(52) U.S. Cl.
CPC ........ *H04L 27/2602* (2013.01); *H04L 5/0037* (2013.01); *H04L 5/0051* (2013.01);
(Continued)

(58) Field of Classification Search
CPC ..... H04L 5/003; H04L 5/0048; H04L 5/0051; H04L 5/00; H04L 5/0037; H04L 5/08;
(Continued)

(56) References Cited

U.S. PATENT DOCUMENTS

| | | | |
|---|---|---|---|
| 11,606,797 B2* | 3/2023 | Khoshnevisan | .. H04W 72/0446 |
| 2018/0279210 A1 | 9/2018 | Sun et al. | |

(Continued)

FOREIGN PATENT DOCUMENTS

| | | |
|---|---|---|
| CN | 105637782 A | 6/2016 |
| CN | 108540985 A | 9/2018 |

(Continued)

OTHER PUBLICATIONS

Intel Corporation: "Remaining Details of NR-PDCCH Structure", 3GPP TSG-RAN WG1 90bis, R1-1717378, Intel PDCCHSTRUCT, 3rd Generation Partnership Project, Mobile Competence Centre, 650, Route Des Lucioles, F-06921 Sophia-Antipolis Cedex, France vol. RAN WG1, No. Prague, CZ, Sep. 9, 2017-Sep. 13, 2017, Oct. 3, 2017, XP051352601, 5 Pages, Paragraph [02.2], Sections 2.1-2.2, Figures 1-3.

(Continued)

*Primary Examiner* — Warner Wong
(74) *Attorney, Agent, or Firm* — Patterson & Sheridan, L.L.P.

(57) ABSTRACT

Certain aspects of the present disclosure provide techniques for transmitting demodulation reference signals (DMRS) with control channels (e.g., physical downlink control channels (PDCCHs)) that enable receiving devices to bundle (e.g., coherently combine) the DMRS over time. A UE may detect a portion of a PDCCH to the UE in at least one resource element group (REG), wherein the REG is in a segment of a control resource set (CORESET) configured for the UE or a group of UEs including the UE and the REG (Continued)

is during a first search space (SS) set occasion configured for the UE or the group of UEs; and process wideband (WB) DMRS in the segment during the first SS set occasion and in the segment during at least one second SS set occasion, wherein the UE does not detect another portion of the PDCCH or another PDCCH during the second SS set occasion.

30 Claims, 12 Drawing Sheets

(52) U.S. Cl.
CPC ......... *H04L 27/2613* (2013.01); *H04W 48/12* (2013.01); *H04L 27/2603* (2021.01)

(58) Field of Classification Search
CPC ......... H04L 5/0041; H04L 2025/03783; H04L 2025/03796; H04L 27/261; H04W 48/00; H04W 48/08; H04W 48/12
See application file for complete search history.

(56) References Cited

U.S. PATENT DOCUMENTS

| | | | |
|---|---|---|---|
| 2018/0359740 A1 | 12/2018 | Sartori et al. | |
| 2019/0103941 A1 | 4/2019 | Seo et al. | |
| 2019/0124689 A1 | 4/2019 | Yang et al. | |
| 2019/0222380 A1* | 7/2019 | Manolakos | ......... H04L 25/0224 |
| 2020/0107344 A1* | 4/2020 | Xu | ...................... H04W 68/005 |
| 2020/0367242 A1* | 11/2020 | Moon | ....................... H04L 1/00 |
| 2021/0006376 A1* | 1/2021 | Cirik | ...................... H04L 5/0094 |
| 2023/0344583 A1* | 10/2023 | Yi | ......................... H04L 5/0053 |
| 2023/0413086 A1* | 12/2023 | Bagheri | ............ H04W 72/1273 |

FOREIGN PATENT DOCUMENTS

| | | | | |
|---|---|---|---|---|
| EP | 3809650 A1 * | 4/2021 | ....... H04L 27/26025 |
| WO | 2013009089 A3 | 4/2013 | |
| WO | 2018199685 A1 | 11/2018 | |
| WO | WO-2019242383 A1 * | 12/2019 | ............ H04W 72/00 |
| WO | WO-2020166045 A1 * | 8/2020 | ......... H04L 27/2602 |
| WO | WO-2020207378 A1 * | 10/2020 | ............ H04B 7/0862 |

OTHER PUBLICATIONS

Supplementary European Search Report—EP20798187—Search Authority—The Hague—Dec. 8, 2022.
ETRI: "Evaluation of 1-port TxD Schemes with Wideband and Narrowband RS for NR-PDCCH", R1-1708097, 3GPP TSG RAN WG1 #89, Hangzhou, China, May 15-19, 2017, May 19, 2017, 9 Pages. Page 5.
International Search Report and Written Opinion—PCT/CN2019/085394—ISA/EPO—Jan. 15, 2020.
International Search Report and Written Opinion—PCT/CN2020/088214—ISA/EPO—Jul. 29, 2020.
Qualcomm Incorporated: "Remaining Open Issues on PDCCH Structure", R1-1721357, 3GPP TSG RAN WG1 #91, Reno, NV, USA, Nov. 27-Dec. 1, 2017, Dec. 1, 2017, 3 Pages.

* cited by examiner

CONTROL CHANNEL DEMODULATION REFERENCE SIGNAL BUNDLING

CROSS-REFERENCE TO RELATED APPLICATIONS

This application is a national stage application under 35 U.S.C. 371 of PCT/CN2020/088214, filed Apr. 30, 2020, which claims benefit of and priority to International Application No. PCT/CN2019/085394, filed May 1, 2019, which are assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for transmitting demodulation reference signals (DMRS) with control channels (e.g., physical downlink control channels (PDCCHs)) that enable receiving devices to bundle (e.g., coherently combine) the DMRS over time.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication that may be performed by a base station (BS). The method generally includes allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; transmitting a portion of the PDCCH via the REG; and transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion.

Certain aspects provide a method for wireless communication that may be performed by a user equipment (UE). The method generally includes detecting a portion of a physical downlink control channel (PDCCH) to the UE in at least one resource element group (REG), wherein the REG is in a segment of a control resource set (CORESET) configured for the UE or a group of UEs including the UE and the REG is during a first search space (SS) set occasion configured for the UE or the group of UEs; and processing wideband (WB) demodulation reference signals (DMRS) in the segment during the first SS set occasion and in the segment during at least one second SS set occasion, wherein the UE does not detect another portion of the PDCCH or another PDCCH during the second SS set occasion.

Certain aspects provide an apparatus for wireless communications. The apparatus generally includes a processor configured to: allocate at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; transmit a portion of the PDCCH via the REG; and transmit wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion; and a memory coupled with the processor.

Certain aspects provide an apparatus for wireless communications. The apparatus generally includes a processor configured to: detect a portion of a physical downlink control channel (PDCCH) to the apparatus in at least one resource element group (REG), wherein the REG is in a segment of a control resource set (CORESET) configured for the apparatus or a group of user equipments (UEs) including the apparatus and the REG is during a first search space (SS) set occasion configured for the apparatus or the group of UEs; and processing wideband (WB) demodulation reference signals (DMRS) in the segment during the first SS set occasion and in the segment during at least one second SS set occasion, wherein the apparatus does not detect another portion of the PDCCH or another PDCCH during the second SS set occasion; and a memory coupled with the processor.

Certain aspects provide an apparatus for wireless communications. The apparatus generally includes means for allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; means for transmitting a portion of the PDCCH via the REG; and means for transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion.

Certain aspects provide an apparatus for wireless communications. The apparatus generally includes means for detecting a portion of a physical downlink control channel (PDCCH) to the apparatus in at least one resource element group (REG), wherein the REG is in a segment of a control resource set (CORESET) configured for the apparatus or a group of user equipments (UEs) including the apparatus and the REG is during a first search space (SS) set occasion configured for the apparatus or the group of UEs; and means for processing wideband (WB) demodulation reference signals (DMRS) in the segment during the first SS set occasion and in the segment during at least one second SS set occasion, wherein the apparatus does not detect another portion of the PDCCH or another PDCCH during the second SS set occasion.

Certain aspects provide a computer-readable medium for wireless communications. The computer-readable medium includes instructions that, when executed by a processing system, cause the processing system to perform operations generally including: allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; transmitting a portion of the PDCCH via the REG; and transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion.

Certain aspects provide a computer-readable medium for wireless communications. The computer-readable medium includes instructions that, when executed by a processing system of a user equipment (UE), cause the processing system to perform operations generally including: detecting a portion of a physical downlink control channel (PDCCH) to the UE in at least one resource element group (REG), wherein the REG is in a segment of a control resource set (CORESET) configured for the UE or a group of UEs including the UE and the REG is during a first search space (SS) set occasion configured for the UE or the group of UEs; and processing wideband (WB) demodulation reference signals (DMRS) in the segment during the first SS set occasion and in the segment during at least one second SS set occasion, wherein the UE does not detect another portion of the PDCCH or another PDCCH during the second SS set occasion.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
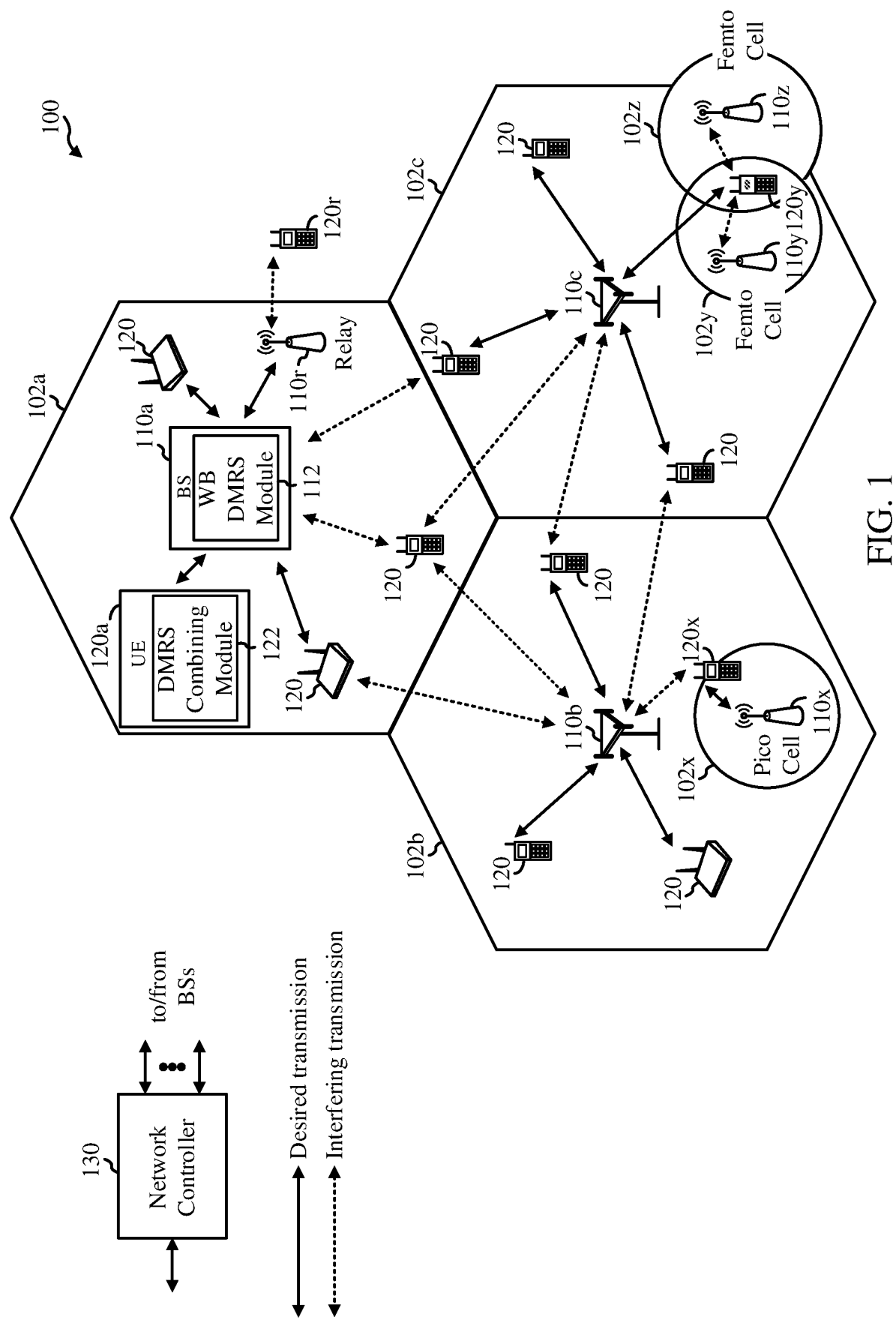
FIG. 1 is a block diagram conceptually illustrating an example telecommunications system, in accordance with certain aspects of the present disclosure.

Aspects of the present disclosure provide apparatus, methods, processing systems, and computer readable mediums for transmitting demodulation reference signals (DMRS) with control channels (e.g., physical downlink control channels (PDCCHs)) that enable receiving devices to bundle (e.g., coherently combine) the DMRS over time. In wireless communications systems, DMRS can be coherently transmitted over different time instants. At the receiver, estimates of the channel determined based on DMRS in different time instants can be coherently combined to enhance the channel estimation performance. DMRS bundling is straightforward for DMRS transmitted in association with physical downlink shared channels (PDSCHs), tracking reference signals (TRS) and channel state information (CSI) reference signals (CSI-RS). Bundling of DMRS in association with PDCCHs is not as straightforward, due to the allocation of control channel elements (CCEs) of each PDCCH across the downlink bandwidth to which a receiving user equipment (UE) is blind. That is, a UE is not aware that a CCE of a PDCCH for the UE is present in a bandwidth part (BWP) until the UE blindly detects the PDCCH, which implies that the UE does not whether a DMRS is present in the BWP unless the UE detects a PDCCH in that BWP.

According to previously known techniques, configuration of DMRS to be transmitted with PDCCHs is on a per control resource set (CORESET) basis. A configuration of DMRS may include whether the DMRS are narrowband or wideband (WB), with narrowband indicated by a precoderGranularity information element in a radio resource control (RRC) configuration and wideband indicated by the sameAsREGbundle and allContiguousRBs IEs in an RRC CORESET configuration. Additionally, a scrambling identifier (ID) for generating a DMRS scrambling sequence may be configured by a pdcch-DMRS-ScramblingID IE. If a pdcch-DMRS-ScramblingID is not configured, then a UE may use the physical layer cell ID as a scrambling ID for receiving the PDCCH DMRS.

According to aspects of the present disclosure, PDCCH DMRS bundling may be more useful for WB DMRS than for narrowband DMRS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120a has a DMRS combining module 122 that may be configured for detecting a portion of a physical downlink control channel (PDCCH) to the UE in at least one resource element group (REG), wherein the REG is in a segment of a control resource set (CORESET) configured for the UE and the REG is during a first search space (SS) set occasion configured for the UE; and processing wideband (WB) demodulation reference signals (DMRS) in the segment during the first SS set occasion and in the segment during at least one second SS set occasion, wherein the UE does not detect another portion of the PDCCH or another PDCCH during the second SS set occasion, according to aspects described herein. In another example, as shown in FIG. 1, the BS 110a has a WB DMRS module 112 that may be configured for allocating at least one resource element group (REG) for transmission of a physical downlink control channel (PDCCH) to a user equipment (UE), wherein the REG is in a segment of a control resource set (CORESET) configured for the UE and the REG is during a first search space (SS) set occasion configured for the UE; transmitting a portion of the PDCCH via the REG; and transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
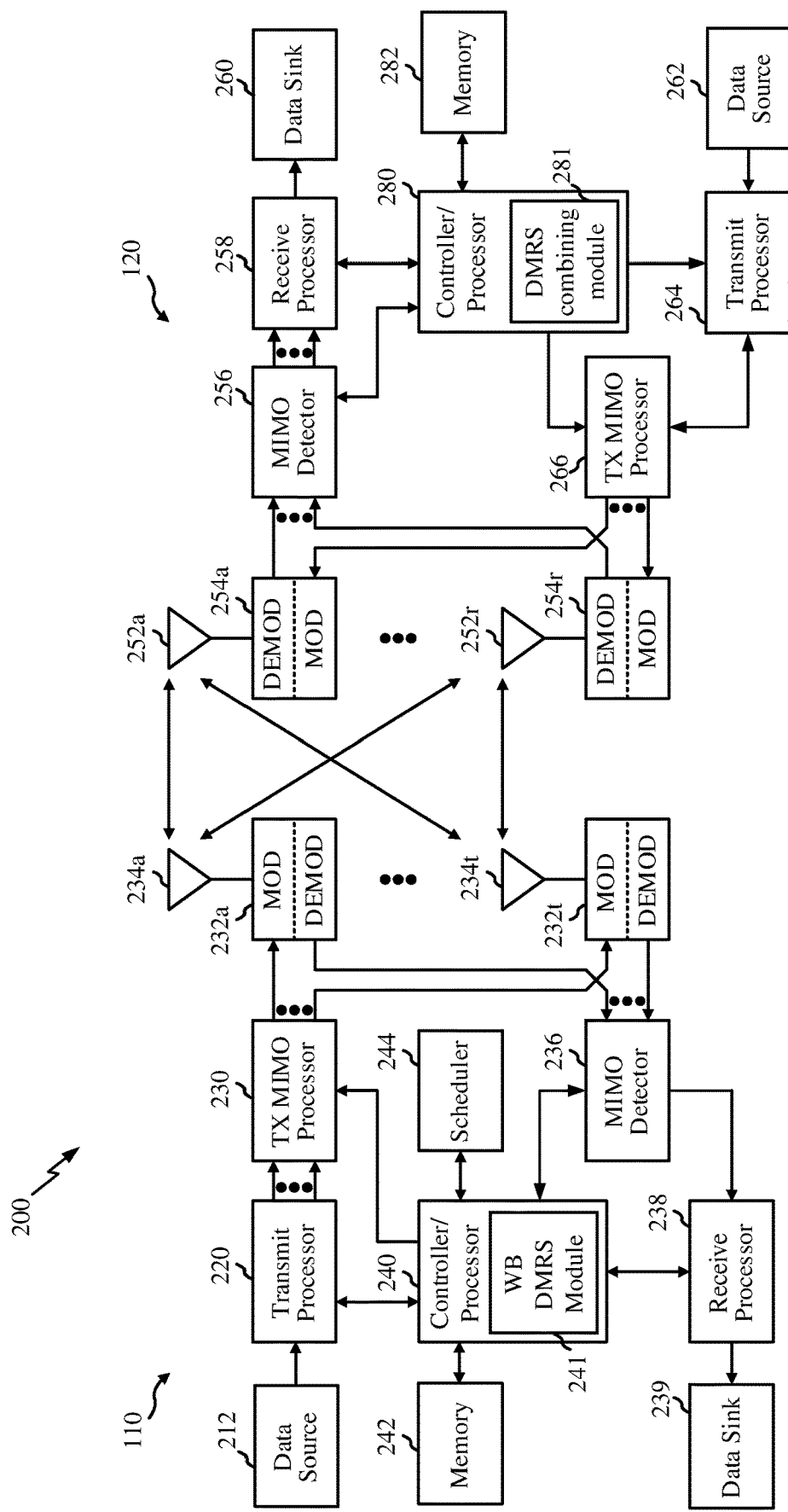
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a WB DMRS module 241 that may be configured for allocating at least one resource element group (REG) for transmission of a physical downlink control channel (PDCCH) to a user equipment (UE), wherein the REG is in a segment of a control resource set (CORESET) configured for the UE and the REG is during a first search space (SS) set occasion configured for the UE; transmitting a portion of the PDCCH via the REG; and transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion, according to aspects described herein. For example, as shown in FIG. 2, the controller/processor 280 of the UE 120 has a DMRS combining module 281 that may be configured for detecting a portion of a physical downlink control channel (PDCCH) to the UE in at least one resource element group (REG), wherein the REG is in a segment of a control resource set (CORESET) configured for the UE and the REG is during a first search space (SS) set occasion configured for the UE; and processing wideband (WB) demodulation reference signals (DMRS) in the segment during the first SS set occasion and in the segment during at least one second SS set occasion, wherein the UE does not detect another portion of the PDCCH or another PDCCH during the second SS set occasion, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Control Channel Demodulation Reference Signal Bundling

Aspects of the present disclosure provide apparatus, methods, processing systems, and computer readable mediums for transmitting demodulation reference signals (DMRS) with control channels (e.g., physical downlink control channels (PDCCHs)) that enable receiving devices to bundle (e.g., coherently combine) the DMRS over time. In wireless communications systems, DMRS can be coherently transmitted over different time instants. At the receiver, estimates of the channel determined based on DMRS in different time instants can be coherently combined to enhance the channel estimation performance. DMRS bundling is straightforward for DMRS transmitted in association with physical downlink shared channels (PDSCHs), tracking reference signals (TRS) and channel state information (CSI) reference signals (CSI-RS). Bundling of DMRS in association with PDCCHs is not as straightforward, due to the allocation of control channel elements (CCEs) of each PDCCH across the downlink bandwidth to which a receiving user equipment (UE) is blind. That is, a UE is not aware that a CCE of a PDCCH for the UE is present in a bandwidth part (BWP) until the UE blindly detects the PDCCH, which implies that the UE does not have information regarding whether a DMRS is present in the BWP unless the UE detects a PDCCH in that BWP.

It is desirable to develop resolutions to two issues in order to enable PDCCH WB DMRS bundling in time domain. One issue is that in previously known techniques, WB PDCCH DMRS are transmitted by a network entity (e.g., a BS) in a segment (e.g., a group of contiguous resource blocks (RBs) in a BWP) to a UE for the UE to use to demodulate the PDCCH, if at least one REG of the PDCCH is transmitted to the UE in the segment. Thus, the network may not transmit DMRS in a segment to the UE, if no REG of the PDCCH is transmitted to the UE in that segment. The network entity may, for example, prefer to not transmit DMRS in the segment without the PDCCH to reduce interference to other devices and/or to save power. Another issue is that, according to previously known techniques, when a network entity (e.g., a BS) transmits WB DMRS in two adjacent PDCCH monitoring occasions, the network entity may not transmit the WB DMRS using a same precoding in the corresponding segment of the two PDCCH monitoring occasions. Thus, in these previously known techniques, a UE may not coherently combine the WB DMRS that are transmitted using different precodings.

According to aspects of the present disclosure, a CORESET configuration may indicate a set of frequency domain resources for PDCCH transmission based on a bitmap named frequencyDomainResources. In the bitmap, a bit that is set to 1 indicates that a group of 6 contiguous resource blocks (RBs) is included in frequency domain resources of this CORESET. The CORESET configuration may also indicate a number of contiguous OFDM symbols in which a PDCCH can be transmitted.

In aspects of the present disclosure, a CORESET may contain more than one segment of contiguous RBs. Gaps between segments correspond to zero bits in the bitmap.

According to aspects of the present disclosure, a maximum of 4 segments can be configured by a network entity (e.g., a BS) for WB DMRS in a CORESET. That is, a BS may configure a CORESET to include 1, 2, 3, or 4 segments of contiguous RBs in a BWP.

Figure 3:
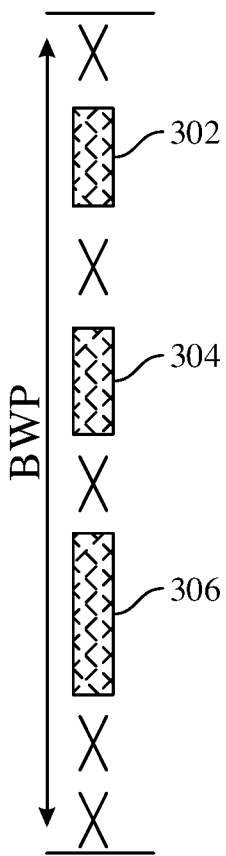
FIG. 3 illustrates an exemplary bandwidth part, according to aspects of the present disclosure.

FIG. 3 illustrates an exemplary bandwidth part 300 having segments 302, 304, and 306 configured as the frequency domain resources for an exemplary CORESET, according to aspects of the present disclosure. An exemplary bitmap [0, ... 0, 0, 1, ... 1, 1, 0, ... 0, 0, 1, ... 1, 1, 0, ... 0, 0, 1, ... 1, 1, 0, ... 0, 0] (e.g., a bitmap named frequencyDomainResources) may be transmitted by a base station (e.g., BS 110, illustrated in FIGS. 1 and 2) configuring the CORESET to indicate that segments 302, 304, and 306 are included in frequency domain resources of the CORESET. As mentioned above, bits set to 1 in the exemplary bitmap correspond to RBs included in the segments (e.g., segments 302, 304, and 306) of the CORESET, while bits set to 0 correspond to gaps (e.g., RBs) between the segments that are not included in the exemplary CORESET.

According to previously known techniques, when no resource element group (REG) of a PDCCH is transmitted in a segment, then a network entity (e.g., a BS) may not transmit a DMRS (e.g., a DMRS associated with the PDCCH) in that segment.

In aspects of the present disclosure, a REG is equivalent to one RB of frequency resources (e.g., twelve subcarriers) during one OFDM symbol. A PDCCH is assigned an integer number of REGs (that is, the PDCCH is transmitted via transmission resources of an integer number of REGs), and these REGs may not be adjacent in a time frequency resource grid, due to interleaving, for example. For example, a BS may interleave REGs from a plurality of PDCCHs in a set of frequency resources, and thus REGs from a first PDCCH may be interleaved with REGs of a second PDCCH, such that one or more REGs of the first PDCCH are not all adjacent to other REGs of the first PDCCH. Accordingly, in previously known techniques, a UE is not expected to obtain any meaningful information from DMRS locations (on a time frequency resource grid) in a segment where no REG of a PDCCH directed to the UE is detected.

According to aspects of the present disclosure, a search space (SS) set configuration indicates a time domain pattern in which a UE monitors transmission resources (e.g., a CORESET) for PDCCH(s) directed to the UE.

In aspects of the present disclosure, a CORESET defines a building block (e.g., a set of RB allocations in the frequency domain and a number of OFDM symbols in the time domain, such as 1 to 3 symbols) of a control region for a UE to monitor for PDCCHs directed to the UE. Each such building block (i.e., the CORESET at a particular time) may be referred to as a SS set occasion.

According to aspects of the present disclosure, an SS set configuration may indicate a periodicity (measured in a number of slots) for monitoring of PDCCHs to a UE. The SS set configuration may also indicate which slots, in each set of slots for the periodicity, for monitoring of PDCCHs to the UE.

In aspects of the present disclosure, more than one SS set occasion of the same SS set may be configured in a slot.

According to aspects of the present disclosure, SS set occasions within a slot may be configured by a symbol level bitmap in the SS set configuration.

Figure 4:
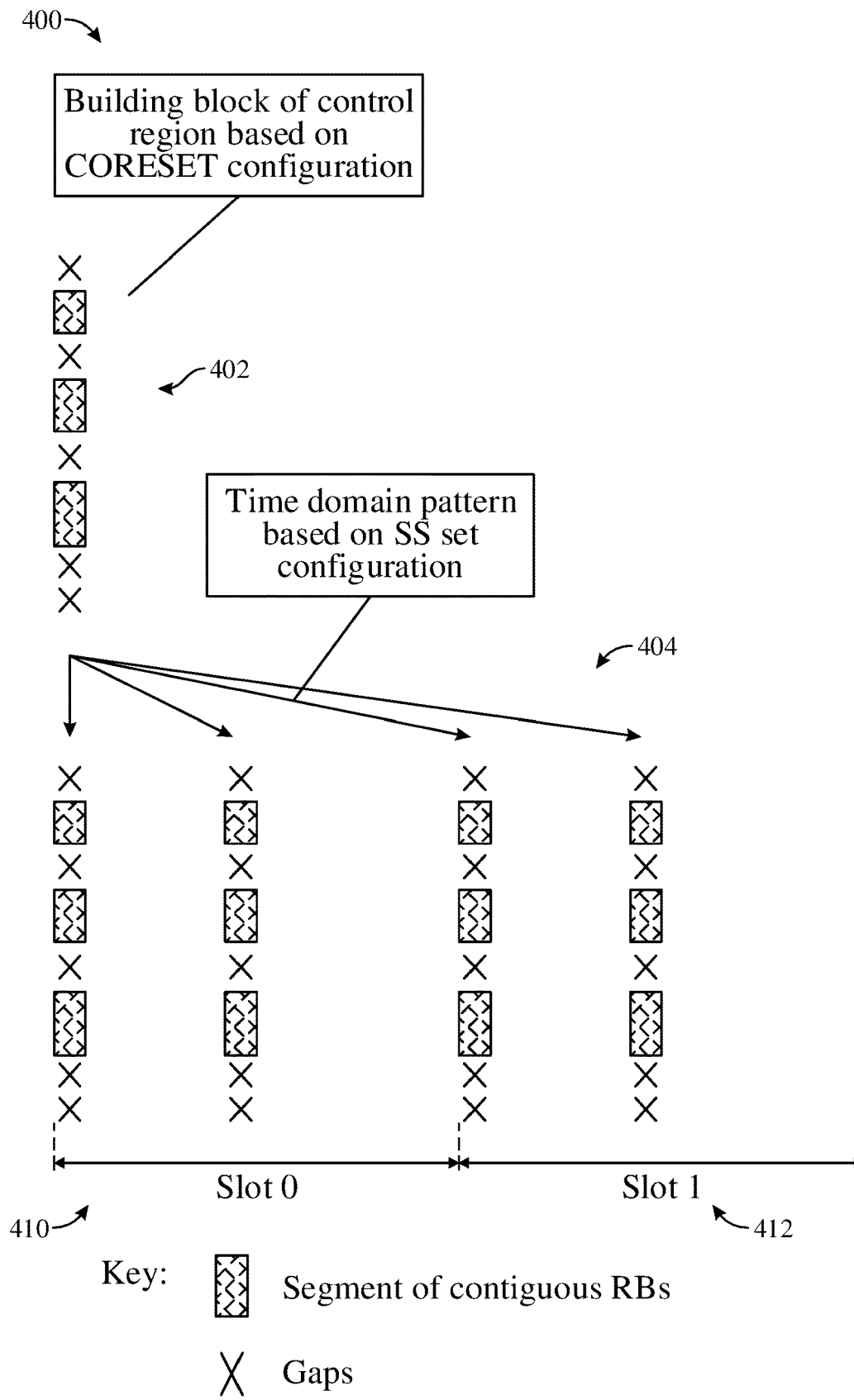
FIG. 4 illustrates an exemplary search space set, according to aspects of the present disclosure.

FIG. 4 illustrates an exemplary SS set 400, according to aspects of the present disclosure. An exemplary CORESET 402 indicates a set of frequency resources to be monitored by a UE for control channels. An exemplary time domain pattern 404, based on an SS set configuration, shows two SS set occasions of a SS set configured in each of two slots 410 and 412. However, the figure does not necessarily show a complete period of an SS set configuration. Instead, the figure may display two slots of an SS set configuration that is valid for a longer number of slots (and therefore would have a periodicity longer than two slots). In aspects of the present disclosure, a symbol level bitmap corresponding to the SS set configuration contains 2 non-zero bits, for example, each non-zero bit corresponding to one of the CORESETs in each of the slots 410 and 412.

In aspects of the present disclosure, a UE may be configured with up to 3 CORESETs and 10 SS sets in each BWP. As described above, a CORESET and a SS set jointly specify a set of time and frequency resources for a UE to monitor for a PDCCH directed to the UE.

According to aspects of the present disclosure, a CORESET can be associated to multiple SS sets, but a SS set can be associated to only one CORESET.

Figure 5:
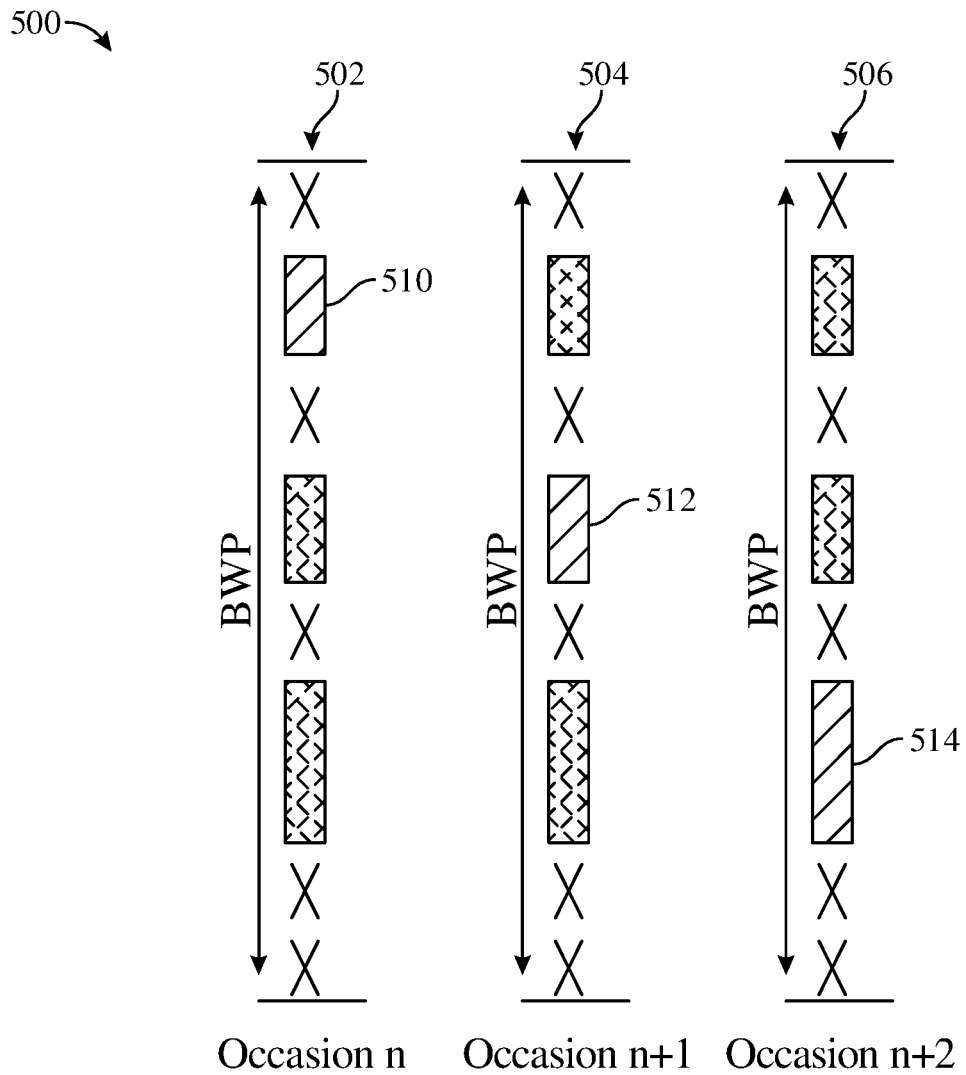
FIG. 5 is an exemplary transmission timeline in which a network entity transmits PDCCHs to a UE, according to previously known techniques.

FIG. 5 is an exemplary transmission timeline 500 in which a network entity (e.g., a BS, such as BS 110, shown in FIGS. 1 and 2) transmits PDCCHs to a UE (e.g., UE 120, shown in FIGS. 1 and 2), according to previously known techniques. The network entity transmits PDCCHs to the UE in three adjacent SS set occasions 502, 504, and 506 in different segments 510, 512, and 514. According to previously known techniques, a BS transmitting a PDCCH transmits wideband DMRS associated with the PDCCH only in segment(s) that contain at least one REG of the PDCCH (e.g., segments 510, 512, and 514) and thus, only the segment(s) that contain at least one REG of the PDCCH have a wideband DMRS associated with the PDCCH. Thus, a UE cannot coherently combine DMRS over multiple occasions in any segment because the DMRS are transmitted in a different segment (i.e., at different frequencies) in each SS set occasion. While the example shows REGs of the PDCCH are transmitted in a single segment in each SS set occasion, the present disclosure is not so limited, and REGs of a PDCCH may fall in multiple segments. For example, a BS may randomize resource allocation to a PDCCH, such that REGs conveying a PDCCH may fall in any segment. In addition, REGs conveying a PDCCH may fall in multiple segments.

In previously known techniques, WB PDCCH DMRS are transmitted by a network entity (e.g., a BS) in a segment to a UE for the UE to use to demodulate the PDCCH, if at least one REG of the PDCCH is transmitted to the UE in the segment. Thus, the network entity does not transmit DMRS in a segment to the UE if no REG of the PDCCH is transmitted to the UE in that segment. The network entity may prefer to not transmit DMRS to reduce interference and/or to save power.

According to aspects of the present disclosure, a network (e.g., a network entity, such as BS 110 or a scheduler in a BS) may allocate a different set of resources to transmit a PDCCH to a UE via PDCCH monitoring occasions associated with the same CORESET. The network may select any PDCCH candidate, from the set of PDCCH candidates configured for the UE, to transmit the PDCCH.

In aspects of the present disclosure, a network entity (e.g., a BS) may transmit WB DMRS in all segments in all SS set occasions configured for the UE, regardless of whether any REG of a PDCCH is transmitted in each of the segments. The UE may be enabled to bundle the WB DMRS of each segment over the time domain.

Figure 6:
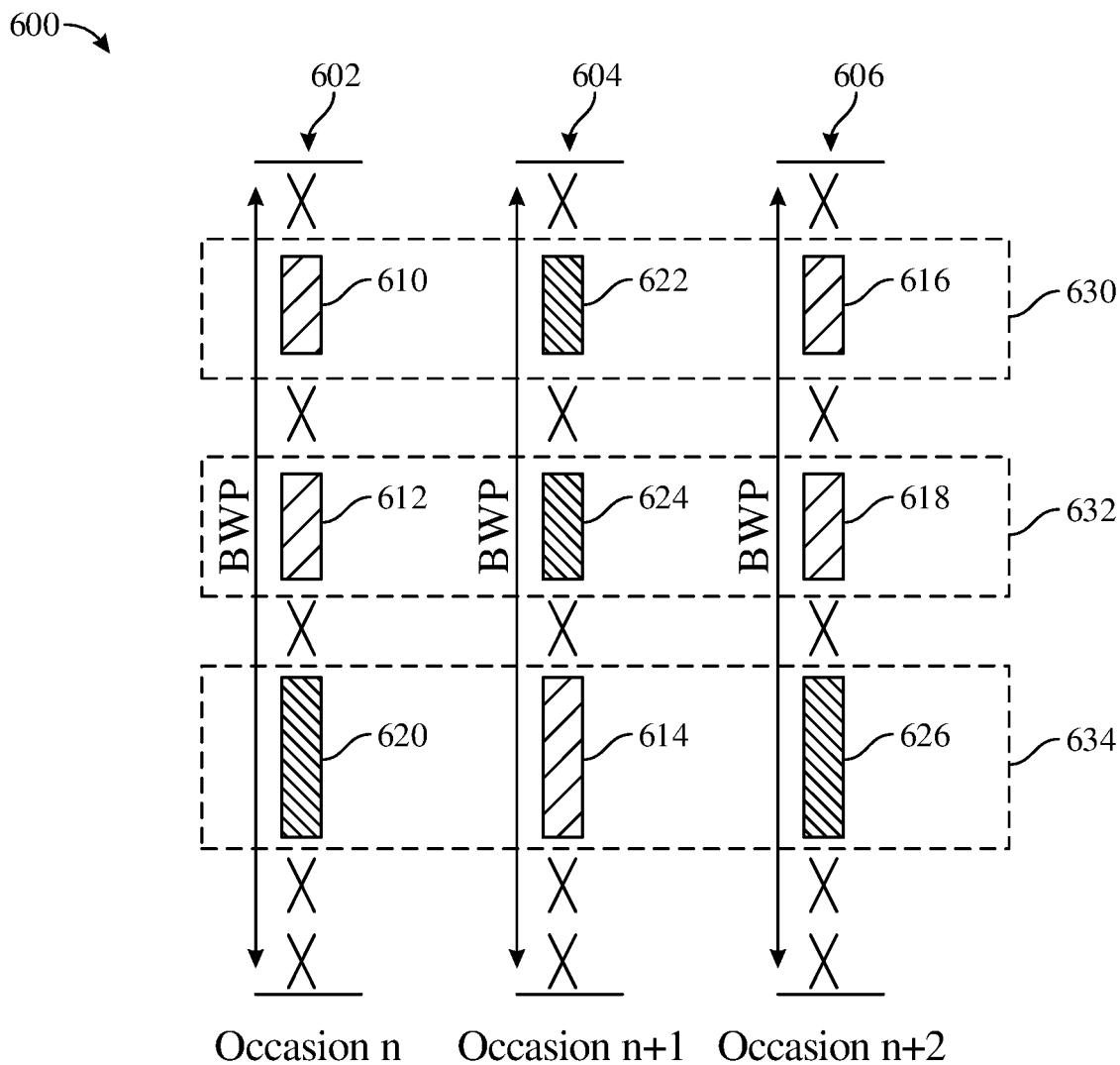
FIG. 6 is an exemplary transmission timeline of a network entity transmitting WB DMRS in all segments in all SS set occasions configured for a UE, according to aspects of the present disclosure.

FIG. 6 is an exemplary transmission timeline 600 of a network entity (e.g., BS 110, shown in FIGS. 1 and 2) transmitting WB DMRS in all segments in all SS set occasions configured for a UE (e.g., UE 120, shown in FIGS. 1 and 2), according to aspects of the present disclosure. The network entity transmits PDCCHs to the UE in three adjacent SS set occasions 602, 604, and 606 in different segments 610, 612, 614, 616, and 618. The BS transmitting the PDCCHs transmits wideband DMRS associated with the PDCCHs in the segments that contain at least one REG of each PDCCH (i.e., segments 610, 612, 614, 616, and 618) and the segments that do not contain at least one REG of the PDCCH (i.e., segments 620, 622, 624, and 626). All of the segments of the CORESET and the SS set have wideband DMRS associated with the PDCCH. Thus, a UE can coherently combine DMRS over multiple SS set occasions in any segment because there are DMRS transmitted in each segment in each of the SS set occasions. In particular, the DMRS in the box 630 can be coherently combined. Similarly the DMRS in the box 632 can be coherently combined, and the DMRS in the box 634 can be coherently combined.

According to aspects of the present disclosure, if a network entity (e.g., BS 110, shown in FIGS. 1 and 2) transmits at least one REG in a segment in a SS set occasion, then the network entity transmits WB DMRS in the segment in one or more following occasions, until RRC reconfigures the CORESET to a different set of frequency resources (e.g., by changing the frequencyDomainResources information element).

In aspects of the present disclosure, if a network entity does not transmit an REG of a PDCCH in a segment in a SS set occasion, then the network entity does not transmit DMRS in the segment in the SS set occasion or any previous SS set occasion.

Figure 7:
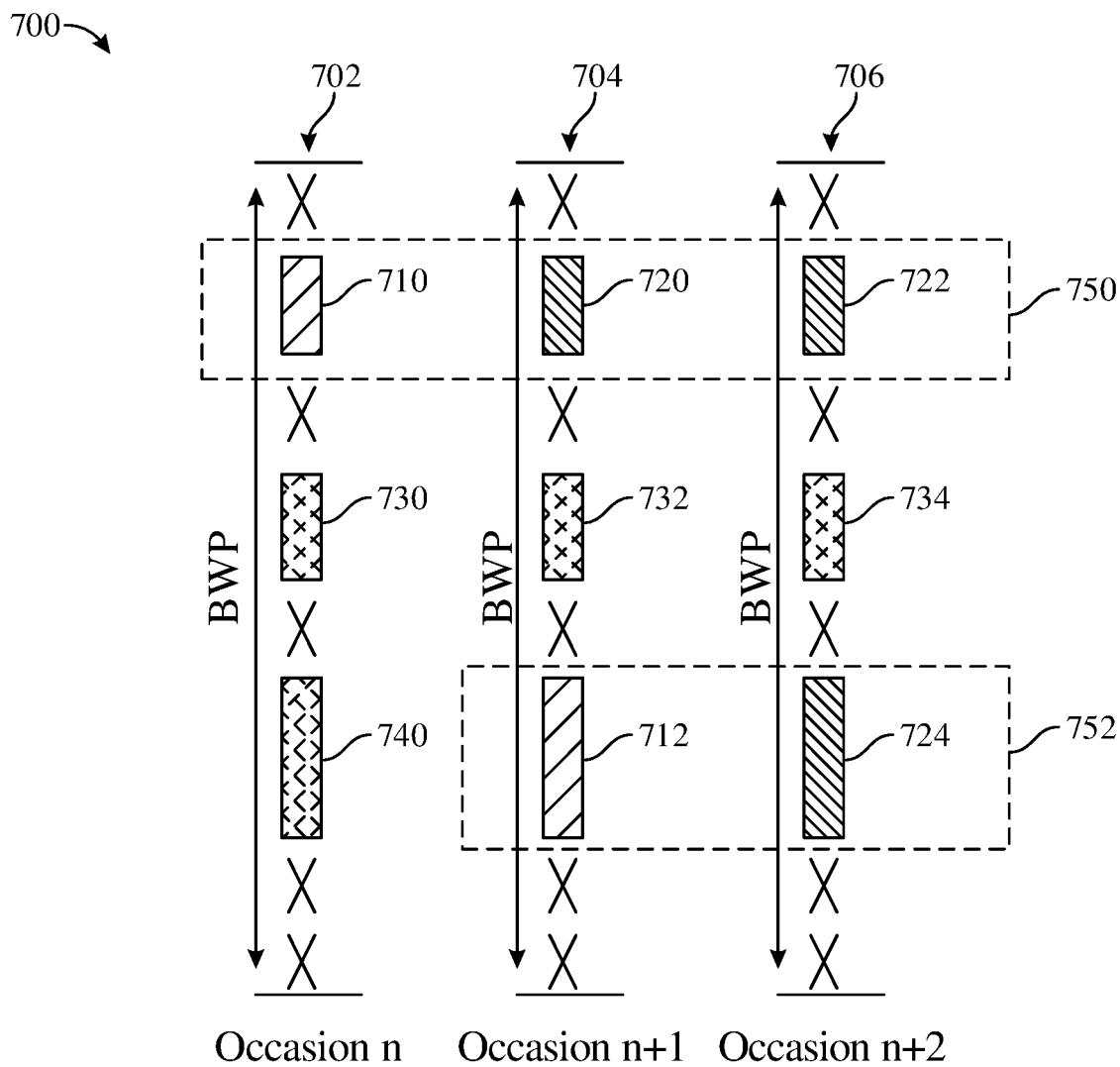
FIG. 7 is an exemplary transmission timeline of a network entity transmitting WB DMRS in segments in which the network entity transmits at least one REG of a PDCCH and in the segments in one or more following occasions, according to aspects of the present disclosure.

FIG. 7 is an exemplary transmission timeline 700 of a network entity (e.g., BS 110, shown in FIGS. 1 and 2) transmitting WB DMRS in segments in which the network entity transmits at least one REG of a PDCCH and in the segments in one or more following occasions, according to aspects of the present disclosure. The network entity transmits PDCCHs to the UE in two adjacent SS set occasions 702 and 704 in different segments 710 and 712. The network entity transmitting the PDCCHs transmits wideband DMRS associated with the PDCCHs in the segment(s) that contain at least one REG of the PDCCHs (i.e., segments 710 and 712) and in the segment(s) in later SS set occasions that do not contain at least one REG of the PDCCH (i.e., segments 720, 722, and 724). The network entity does not transmit DMRS in the segments 730, 732, and 734 in which the network entity does not transmit an REG of the PDCCH. The network entity also does not transmit DMRS in the segment 740 in SS set occasion 702. Segments of the CORESET and the SS set that have at least one REG of the PDCCH also have wideband DMRS associated with the PDCCH, as do the segments in succeeding SS set occasions. Thus, a UE can coherently combine DMRS over multiple occasions in the segments 710, 720, and 722, because there are DMRS transmitted in the segment in each of those SS set occasions. In particular, the DMRS in the box 750 can be coherently combined. Similarly the DMRS in the segments 712 and 724 in the box 752 can be coherently combined.

According to aspects of the present disclosure, if a network entity (e.g., BS 110, shown in FIGS. 1 and 2) transmits at least one REG of a control channel (e.g., a PDCCH) in a segment in a SS set occasion, then the network entity also transmits WB DMRS in the segment in the SS set occasion and in a number, N, of adjacent SS set occasions that contains the SS set occasion.

In aspects of the present disclosure, if a network entity (e.g., BS 110, shown in FIGS. 1 and 2) transmits at least one REG of a control channel (e.g., a PDCCH) in a segment in a SS set occasion, then the network entity also transmits WB DMRS in all SS set occasions within a certain time duration that contains the SS set occasion.

In aspects of the present disclosure, the duration for transmission of DMRS in segments without at least one REG of a control channel can be one period of an SS set configuration periodicity. For example, if a network entity transmits a REG of a control channel in any SS set occasion in a slot associated with a CORESET, then the network entity transmits WB DMRS in all SS set occasions that are associated with the CORESET of the slot.

Figure 8:
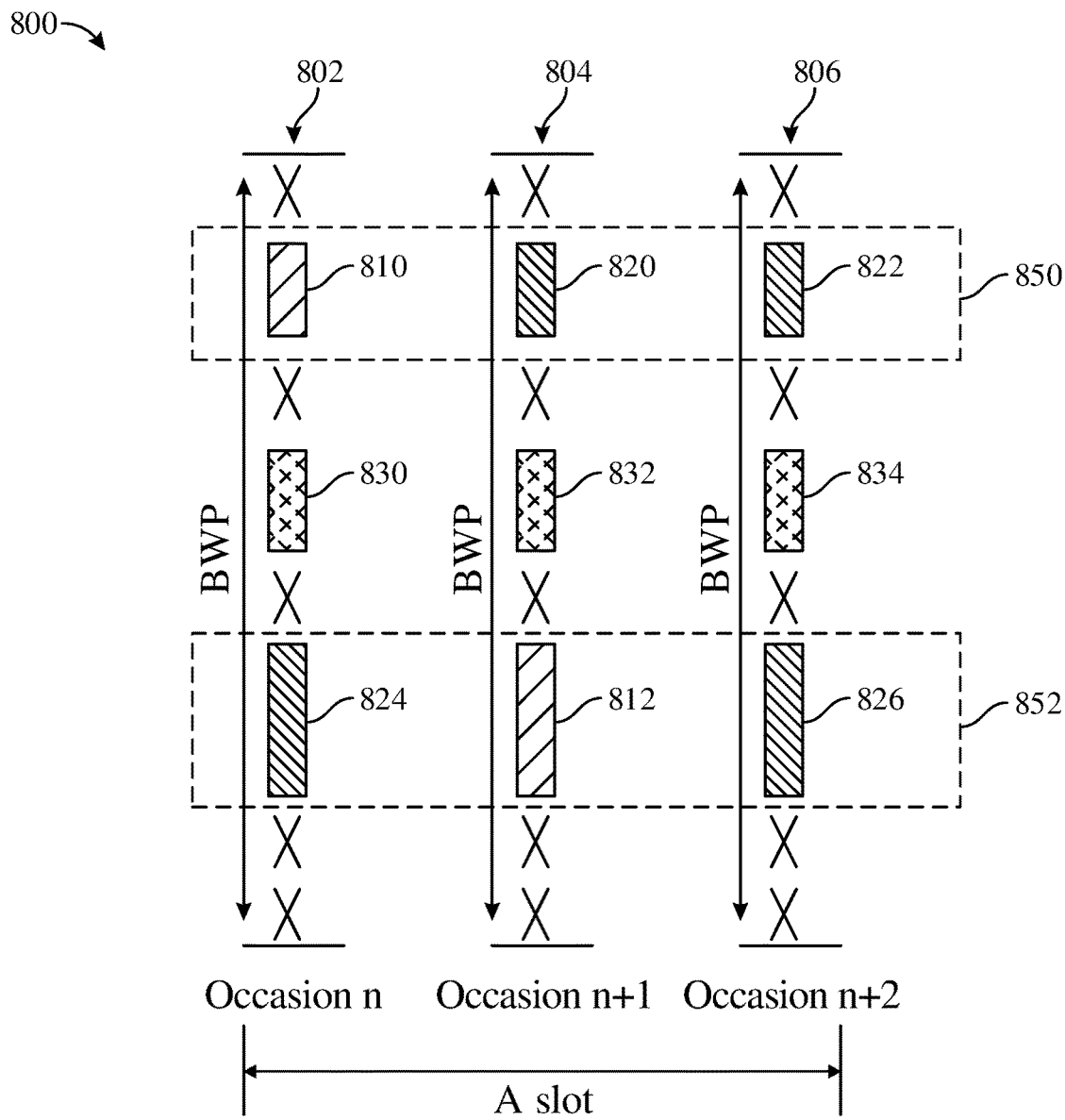
FIG. 8 is an exemplary transmission timeline of a network entity transmitting WB DMRS in segments in which the network entity transmits at least one REG of a PDCCH and in adjacent SS set occasions, according to aspects of the present disclosure.

FIG. 8 is an exemplary transmission timeline 800 of a network entity (e.g., BS 110, shown in FIGS. 1 and 2) transmitting WB DMRS in segments in which the network entity transmits at least one REG of a PDCCH and in adjacent SS set occasions, according to aspects of the present disclosure. The network entity transmits PDCCHs to the UE in two adjacent SS set occasions 802 and 804 in different segments 810 and 812. The network entity transmitting the PDCCHs transmits wideband DMRS associated with the PDCCH in the segments that contain at least one REG of the PDCCH (i.e., segments 810 and 812) and in the segments in adjacent SS set occasions that do not contain at least one REG of the PDCCH (i.e., segments 820, 822, 824, and 826). The network entity does not transmit DMRS in the segments 830, 832, and 834 in which the network entity does not transmit an REG of the PDCCH. Segments of the CORESET and the SS set that have at least one REG of the PDCCH also have wideband DMRS associated with the PDCCH, as do the segments in adjacent SS set occasions. Thus, a UE can coherently combine DMRS over multiple occasions in the segments 810, 820, and 822, because there are DMRS transmitted in the segment in each of those SS set occasions. In particular, the DMRS in the box 850 can be coherently combined. Similarly the DMRS in the box 852 can be coherently combined.

According to previously known techniques, when a network entity (e.g., a BS) transmits WB DMRS in two adjacent PDCCH monitoring occasions (i.e., the network entity transmits a PDCCH in each SS set occasion), the network entity does not necessarily transmit the WB DMRS using a same precoding in the corresponding segment of the two occasions. Thus, in these previously known techniques, a UE cannot necessarily coherently combine the WB DMRS, because the WB DMRS may be transmitted using different precodings.

In aspects of the present disclosure, a network entity (e.g., BS 110, shown in FIGS. 1 and 2) that configures WB DMRS for a CORESET maintains either a same precoding matrix for transmitting the WB DMRS or maintains phase continuity of a precoding matrix over time, so UEs can benefit from coherent combining of DMRS bundling.

According to aspects of the present disclosure, maintaining of the precoding matrix or phase continuity of the precoding matrix can be applied by a network entity in all SS set occasions for a CORESET (e.g., similar to the technique shown in FIG. 6), within a number of succeeding SS set occasions (e.g., similar to the technique shown in FIG. 7), or in a duration (e.g., for a slot) that contains the occasion where at least one REG is transmitted (e.g., similar to the technique shown in FIG. 8).

In aspects of the present disclosure, a network entity (e.g., BS 110, shown in FIGS. 1 and 2) may configure PDCCH DMRS bundling by adding an indication in a CORESET configuration that indicates the network entity is transmitting additional WB DMRS to enable WB DMRS bundling, as discussed above with references to FIGS. 6-8. According to these aspects of the present disclosure, this is a CORESET level PDCCH DMRS bundling.

In aspects of the present disclosure, a network entity (e.g., BS 110, shown in FIGS. 1 and 2) may implicitly configure WB DMRS bundling (i.e., implicitly indicating that the network entity is transmitting additional WB DMRS to enable WB DMRS bundling, as discussed above with references to FIGS. 6-8) whenever WB DMRS is configured for a CORESET. Thus, if WB DMRS is configured for a CORESET, then DMRS bundling is enabled for this CORESET. According to aspects of the present disclosure, implicitly configuring of WB DMRS bundling may be backward compatible for UEs. That is, a UE operating according to previously known techniques (and therefore not attempting to coherently combine WB DMRS) may be able to receive PDCCHs and other control channels from the network entity.

In aspects of the present disclosure, a network entity (e.g., BS 110, shown in FIGS. 1 and 2) may configure WB DMRS bundling (i.e., indicating that the network entity is transmitting additional WB DMRS to enable WB DMRS bundling, as discussed above with references to FIGS. 6-8) for a search space associated with a CORESET whenever WB DMRS is configured for the CORESET. According to aspects of the present disclosure, configuring WB DMRS bundling for a search space is SS set level PDCCH DMRS bundling.

According to aspects of the present disclosure, all PDCCH monitoring occasions for all search space sets associated with a same CORESET may be bundled. Thus, a network entity (e.g., BS 110, shown in FIGS. 1 and 2) may transmit WB DMRS in all SS set occasions of all search spaces associated with a CORESET, and a UE (e.g., UE 120, shown in FIGS. 1 and 2) configured with the CORESET may coherently combine WB DMRS from all of the SS set occasions of a search space associated with the CORESET.

In aspects of the present disclosure, all PDCCH monitoring occasions associated with the same search space sets may be bundled. Thus, a network entity (e.g., BS 110, shown in FIGS. 1 and 2) may transmit WB DMRS in all SS set occasions of a search space associated with a CORESET, and a UE (e.g., UE 120, shown in FIGS. 1 and 2) configured with the CORESET and the search space may coherently combine WB DMRS from all of the SS set occasions of the search space associated with the CORESET.

According to aspects of the present disclosure, DMRS transmitted in some search space sets associated with the same CORESET can be bundled together. Thus, a network entity (e.g., BS 110, shown in FIGS. 1 and 2) may transmit WB DMRS in all SS set occasions of a selected search space associated with a CORESET, and a UE (e.g., UE 120, shown in FIGS. 1 and 2) configured with the CORESET and that search space may coherently combine WB DMRS from all of the SS set occasions of the search space associated with the CORESET.

In aspects of the present disclosure, a set of search space sets for which WB DMRS bundling is configured may be based on DCI formats configured for a UE monitoring a search space set in the set of search space sets.

According to aspects of the present disclosure, the set of search space sets for which WB DMRS bundling is configured may be based on the configured SS type, i.e., common search space (CSS) or UE specific search space (USS). That is, a network entity may configure WB DMRS bundling in a CSS and in a USS specific for a first UE, while the network entity does not configure WB DMRS bundling for a USS specific for a second UE.

In aspects of the present disclosure, the set of search space sets for which WB DMRS bundling is configured may be based on a configured SS index. That is, a network entity may configure WB DMRS bundling for search spaces having SS indices from a set (e.g., indices that are even), while the network entity does not configure WB DMRS bundling for search spaces having SS indices that are not in the set (e.g., indices that are odd).

Figure 9:
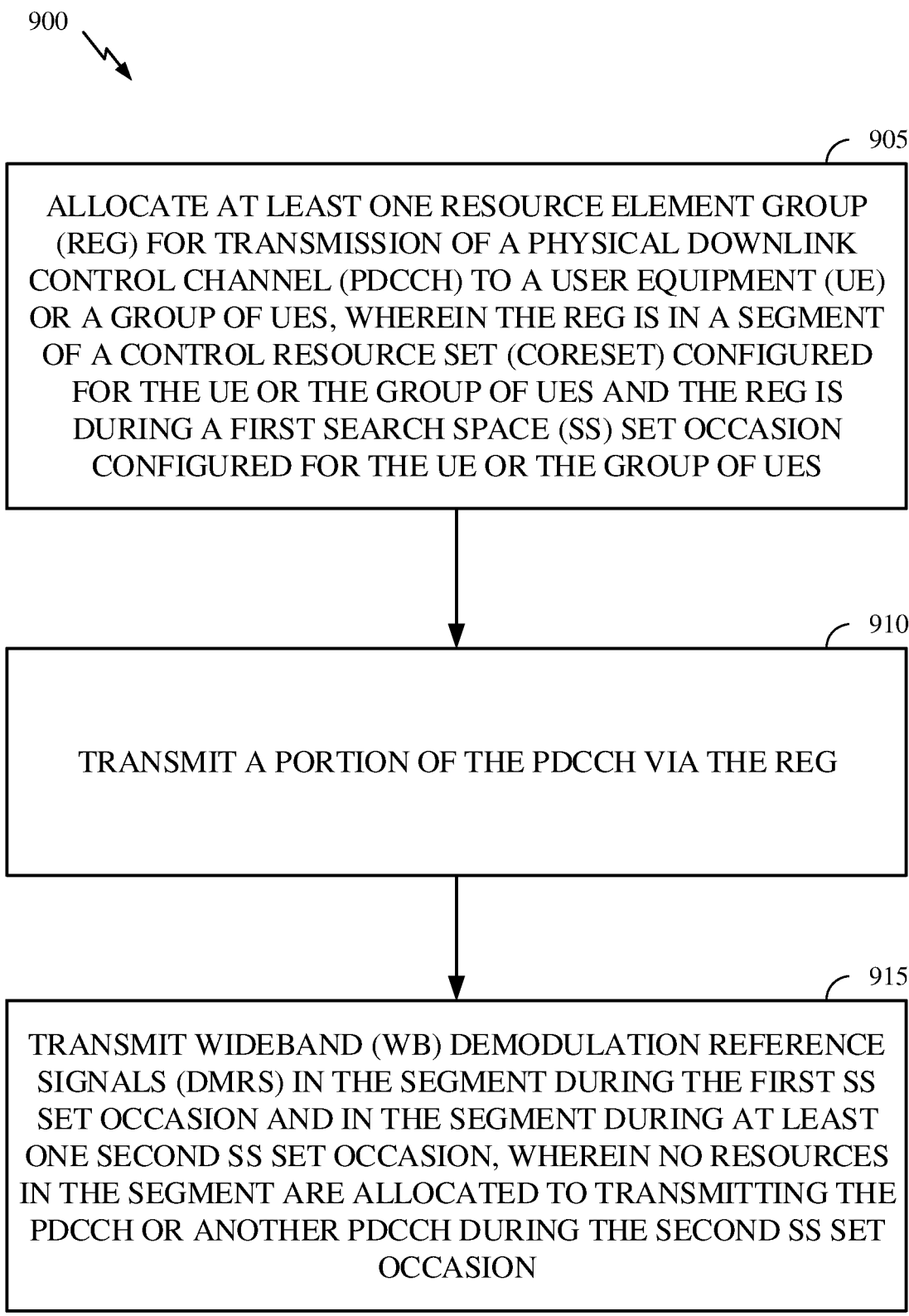
FIG. 9 is a flow diagram illustrating example operations for wireless communication by a base station (BS), in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as BS 110 shown in the FIGS. 1 and 2). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 905, by the BS allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs. For example, BS 110a (see FIG. 1) allocates a set of REGs in a segment at 712 (see FIG. 7) for transmission of a PDCCH to UE 120a, wherein the segment at 712 is a segment of a CORESET configured for the UE and the REG is during a first SS set occasion 704 configured for the UE.

At block 910, operations 900 continue with the BS transmitting a portion of the PDCCH via the REG. Continuing the example from above, the BS 110a transmits a portion of the PDCCH via the REG in the segment at 712.

The operations 900 continue at block 915 with the BS transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion. Continuing the example from above, the BS 110a transmits WB DMRS in the segment at 712 during the first SS set occasion 704 and in the segment at 724 (see FIG. 7) during the second SS set occasion 706, wherein no resources in the segment at 724 are allocated to transmitting the PDCCH or another PDCCH during the second SS set occasion.

Figure 10:
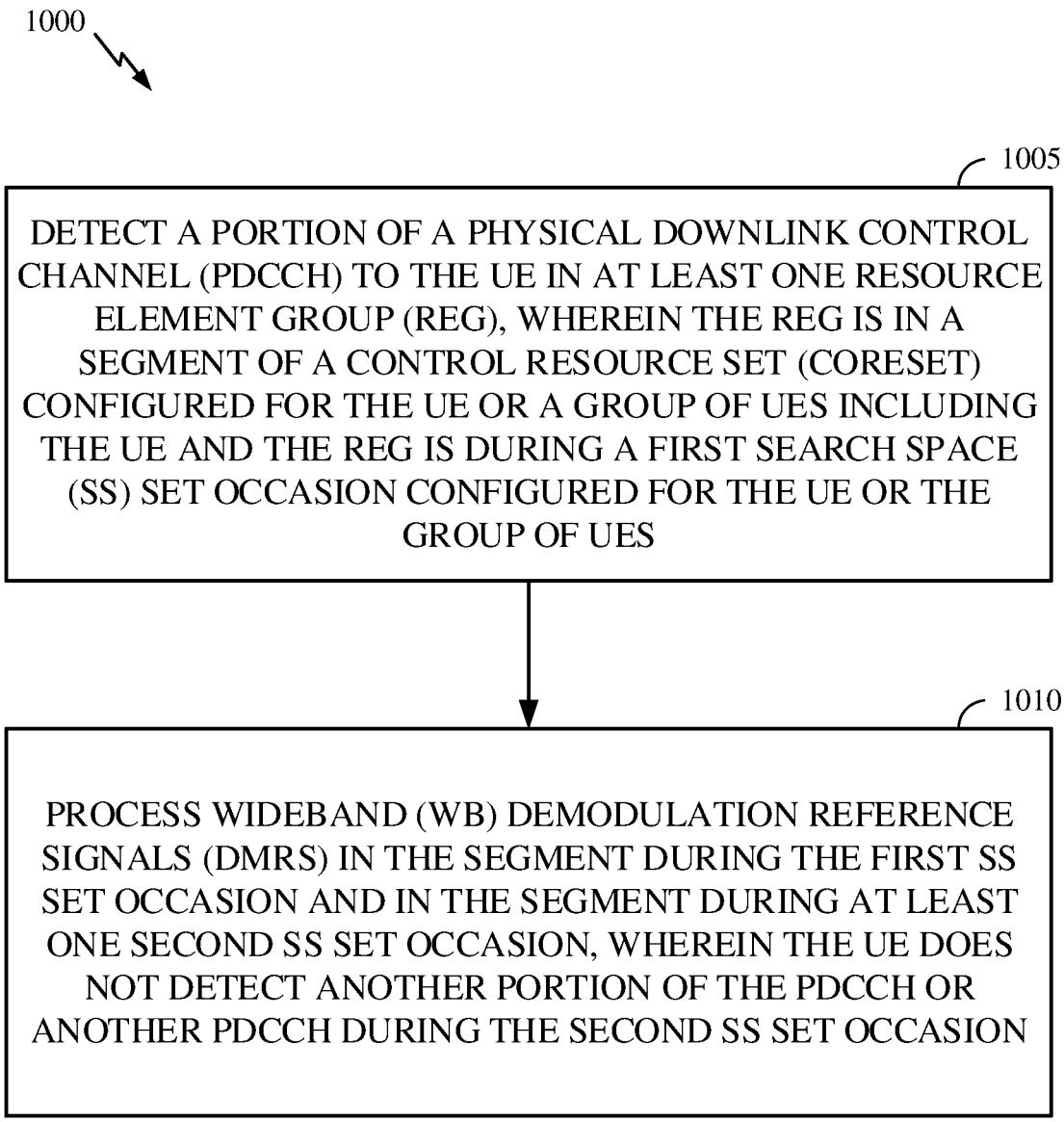
FIG. 10 is a flow diagram illustrating example operations for wireless communication by a user equipment (UE), in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as UE 120, shown in FIGS. 1 and 2). The operations 1000 may be complimentary operations by the UE to the operations 900 performed by the BS. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, by the UE detecting a portion of a physical downlink control channel (PDCCH) to the UE in at least one resource element group (REG), wherein the REG is in a segment of a control resource set (CORESET) configured for the UE or a group of UEs including the UE and the REG is during a first search space (SS) set occasion configured for the UE or the group of UEs. For example, UE 120a detects a portion of a PDCCH to the UE in at least one REG, wherein the REG is in a segment at 712 (see FIG. 7) of a CORESET configured for the UE and the REG is during a first SS set occasion 704 configured for the UE.

At block 1010, operations 1000 continue with the UE processing wideband (WB) demodulation reference signals (DMRS) in the segment during the first SS set occasion and in the segment during at least one second SS set occasion, wherein the UE does not detect another portion of the PDCCH or another PDCCH during the second SS set occasion. Continuing the example from above, the UE 120a processes WB DMRS in the segment at 712 during the first SS set occasion 704 and in the segment at 724 during the second SS set occasion 706, wherein the UD does not detect another portion of the PDCCH or another PDCCH during the second SS set occasion.

Figure 11:
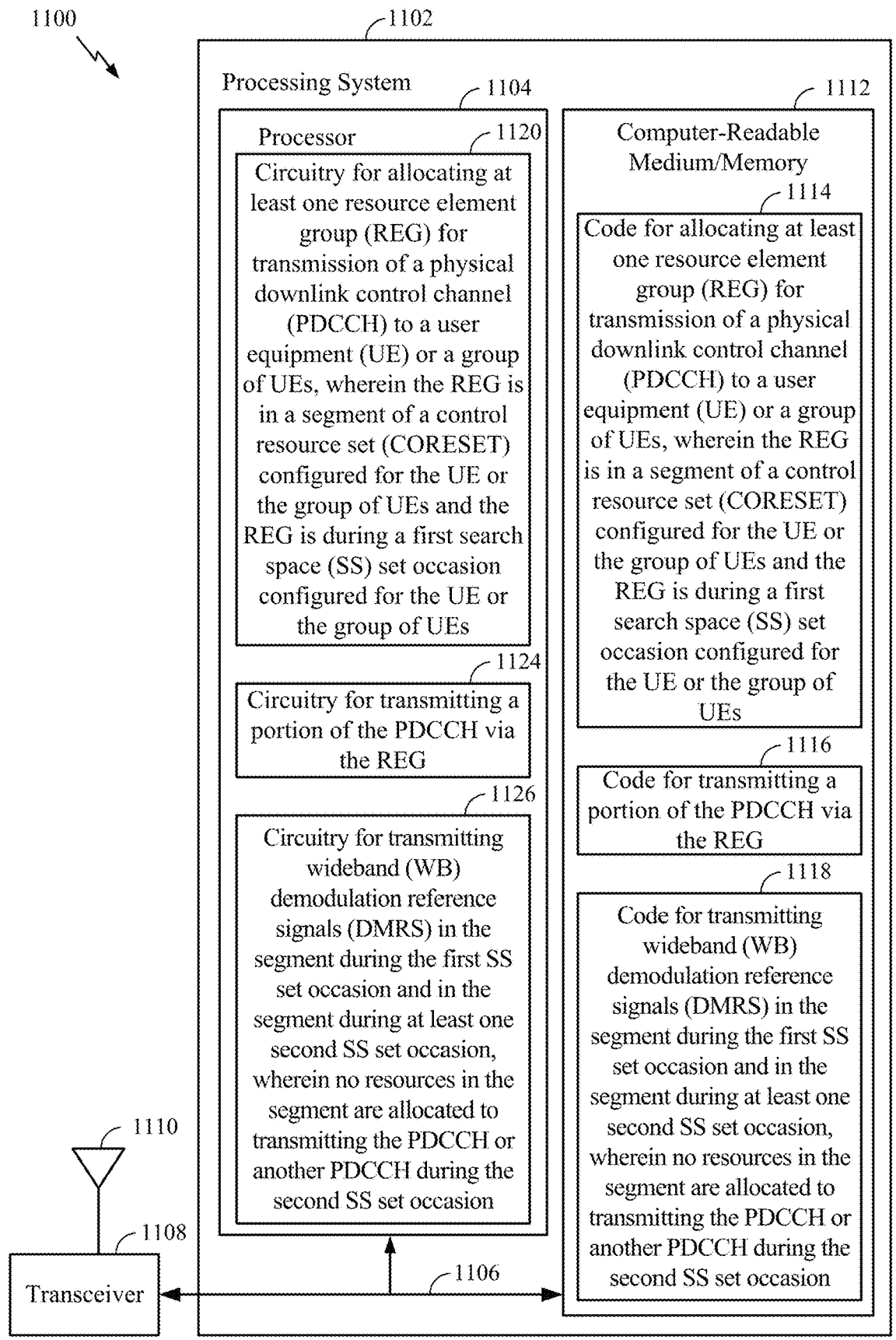
FIG. 11 illustrates a communications device that may include various components configured to perform the operations of FIG. 9 for the techniques disclosed herein in accordance with aspects of the present disclosure.

FIG. 11 illustrates a communications device 1100 that may include various components (e.g., corresponding to means-plus-function components) configured to perform operations for the techniques disclosed herein for transmitting demodulation reference signals (DMRS) with control channels (e.g., physical downlink control channels (PDCCHs)) that enable receiving devices to bundle (e.g., coherently combine) the DMRS over time, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 9 or other operations for transmitting DMRS with control channels (e.g., PDCCHs) that enable receiving devices to bundle (e.g., coherently combine) the DMRS over time. In certain aspects, computer-readable medium/memory 1112 stores code 1114 for allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; code 1116 for transmitting a portion of the PDCCH via the REG; and code 1118 for transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion. In certain aspects, the processor 1104 has circuitry configured to implement the code stored in the computer-readable medium/memory 1112. The processor 1104 includes circuitry 1120 for allocating at least one resource element group (REG) for transmission of a physical downlink control channel (PDCCH) to a user equipment (UE) or a group of UEs, wherein the REG is in a segment of a control resource set (CORESET) configured for the UE or the group of UEs and the REG is during a first search space (SS) set occasion configured for the UE or the group of UEs; circuitry 1124 for transmitting a portion of the PDCCH via the REG; and circuitry 1126 for transmitting wideband (WB) demodulation reference signals (DMRS) in the segment during the first SS set occasion and in the segment during at least one second SS set occasion, wherein no resources in the segment are allocated to transmitting the PDCCH or another PDCCH during the second SS set occasion.

Figure 12:
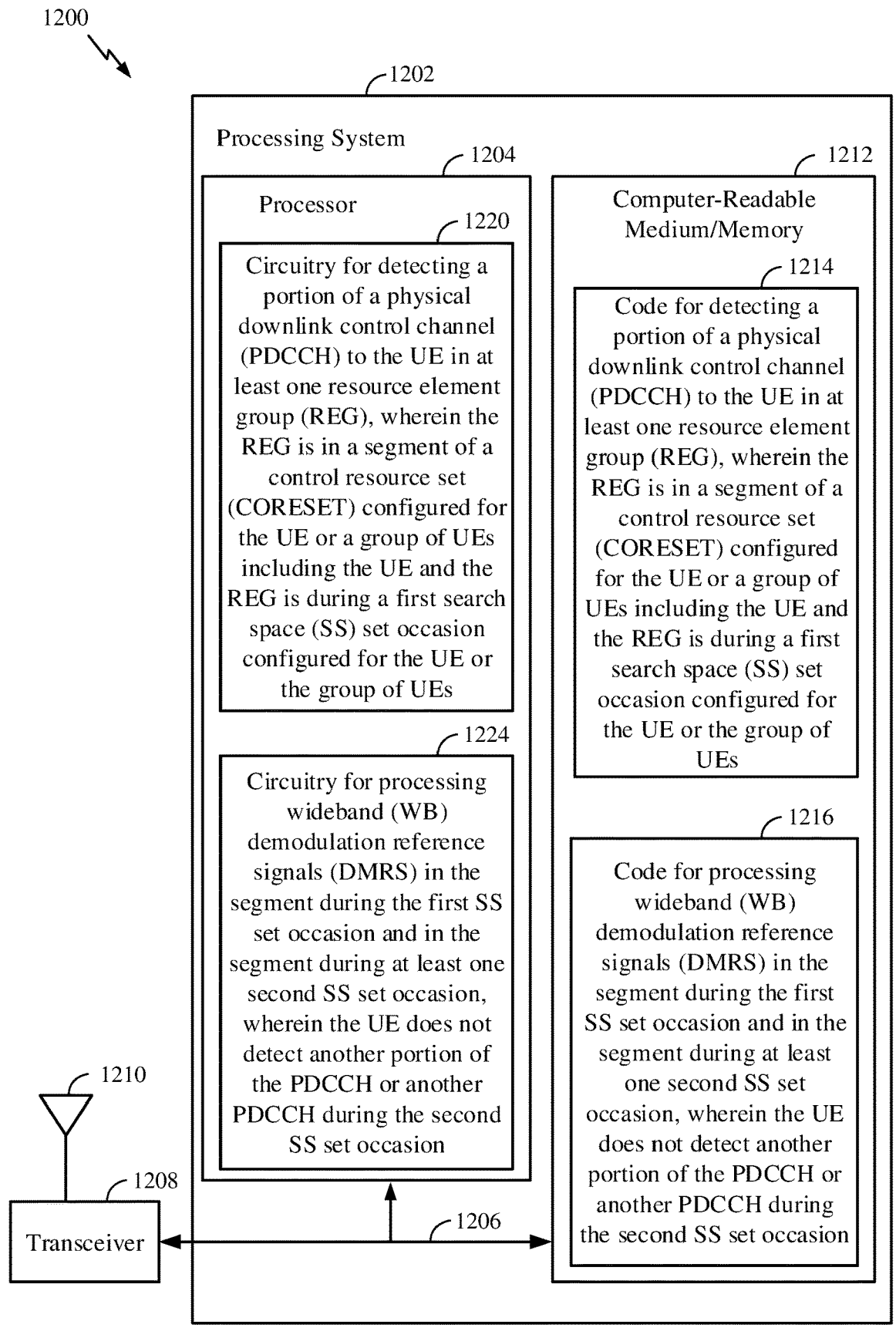
FIG. 12 illustrates a communications device that may include various components configured to perform the operations of FIG. 10 for the techniques disclosed herein in accordance with aspects of the present disclosure.

FIG. 12 illustrates a communications device 1200 that may include various components (e.g., corresponding to means-plus-function components) configured to perform operations for the techniques disclosed herein for bundling (e.g., coherently combining) DMRS over time, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/ memory 1212 is configured to store instructions (e.g., computer-executable code) that when executed by the processor 1204, cause the processor 1204 to perform the operations illustrated in FIG. 10 or other operations for bundling (e.g., coherently combining) DMRS over time. In certain aspects, computer-readable medium/memory 1212 stores code 1214 for detecting a portion of a physical downlink control channel (PDCCH) to the UE in at least one resource element group (REG), wherein the REG is in a segment of a control resource set (CORESET) configured for the UE or a group of UEs including the UE and the REG is during a first search space (SS) set occasion configured for the UE or the group of UEs; and code 1216 for processing wideband (WB) demodulation reference signals (DMRS) in the segment during the first SS set occasion and in the segment during at least one second SS set occasion, wherein the UE does not detect another portion of the PDCCH or another PDCCH during the second SS set occasion. In certain aspects, the processor 1204 has circuitry configured to implement the code stored in the computer-readable medium/memory

1212. The processor 1204 includes circuitry 1220 for detecting a portion of a physical downlink control channel (PDCCH) to the UE in at least one resource element group (REG), wherein the REG is in a segment of a control resource set (CORESET) configured for the UE or a group of UEs including the UE and the REG is during a first search space (SS) set occasion configured for the UE or the group of UEs; and circuitry 1224 for processing wideband (WB) demodulation reference signals (DMRS) in the segment during the first SS set occasion and in the segment during at least one second SS set occasion, wherein the UE does not detect another portion of the PDCCH or another PDCCH during the second SS set occasion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
    allocating at least one resource element group (REG) for transmission of a physical downlink control channel (PDCCH) to a user equipment (UE) or a group of UEs, wherein the REG is in a first segment comprising a first group of contiguous resource blocks (RBs) in a control resource set (CORESET) configured for the UE or the group of UEs and the REG is during a first search space (SS) set occasion of an SS set configured for the UE or the group of UEs;
    transmitting a portion of the PDCCH via the REG; and
    transmitting wideband (WB) demodulation reference signals (DMRS) in the first segment during the first SS set occasion and in a second segment comprising a second group of contiguous RBs during a second SS set occasion of the SS set, wherein no resources in the second segment are allocated to transmitting the PDCCH or another PDCCH during the second SS set occasion.

2. The method of claim 1, further comprising transmitting the WB DMRS in every segment of the CORESET during every SS set occasion of the SS set.

3. The method of claim 1, further comprising transmitting the WB DMRS in at least one segment during each SS set occasion of the SS set that is subsequent to the first SS set occasion of the SS set.

4. The method of claim 1, further comprising:
    transmitting the WB DMRS in at least one segment during a plurality of SS set occasions of the SS set that are adjacent to the first SS set occasion of the SS set.

5. The method of claim 1, further comprising:
    transmitting the WB DMRS in at least one segment during all of the SS set occasions of the SS set that contains the first SS set occasion within a certain time duration.

6. The method of claim 5, wherein the SS set configuration has a periodicity and the duration is at least one period of the SS set configuration periodicity.

7. The method of claim 1, further comprising:
    transmitting a CORESET configuration indicating that DMRS bundling is enabled for the CORESET.

8. The method of claim 1, further comprising:
    transmitting a SS set configuration indicating that DMRS bundling is enabled for the SS set.

9. The method of claim 1, further comprising:
    transmitting the WB DMRS in each segment of the CORESET during each SS set occasion of each SS set associated with the CORESET.

10. The method of claim 1, further comprising:
    transmitting the WB DMRS in each segment of a plurality of CORESETs during each SS set occasion of the SS set, wherein each of the plurality of CORESETs is associated with the SS set.

11. The method of claim 1, further comprising:
transmitting the WB DMRS in each segment of the CORESET during each SS set occasion of a plurality SS sets, wherein each of the plurality of SS sets is associated with the CORESET.

12. The method of claim 11, further comprising:
determining the plurality of SS sets based on one or more configured DCI formats.

13. The method of claim 11, further comprising:
determining the plurality of SS sets based on the type of the SS.

14. The method of claim 11, further comprising:
determining the plurality of SS sets based on an index of the SS.

15. The method of claim 1, wherein:
transmitting the WB DMRS in the first segment during the first SS set occasion comprises transmitting the WB DMRS using a first precoding matrix; and
transmitting the WB DMRS in the second segment during the second SS set occasion comprises transmitting the WB DMRS using the first precoding matrix or a second precoding matrix selected to enable the WB DMRS during the second SS set occasion to have phase continuity with the WB DMRS during the first SS set occasion.

16. The method of claim 15, further comprising:
transmitting an indication of the first precoding matrix for the WB DMRS in the first segment during the first SS set occasion; and
transmitting the indication of the first precoding matrix or an indication of the second precoding matrix in the second segment during the second SS set occasion.

17. A method for wireless communications by a user equipment (UE), comprising:
detecting a portion of a physical downlink control channel (PDCCH) to the UE in at least one resource element group (REG), wherein the REG is in a first segment comprising a first group of contiguous resource blocks (RBs) in a control resource set (CORESET) configured for the UE or a group of UEs including the UE and the REG is during a first search space (SS) set occasion of an SS set configured for the UE or the group of UEs; and
processing wideband (WB) demodulation reference signals (DMRS) in the first segment during the first SS set occasion and in a second segment comprising a second group of contiguous RBs during a second SS set occasion of the SS set, wherein the UE does not detect another portion of the PDCCH or another PDCCH during the second SS set occasion.

18. The method of claim 17, further comprising processing the WB DMRS in every segment of the CORESET during every SS set occasion of the SS set.

19. The method of claim 17, further comprising processing the WB DMRS in at least one segment during each SS set occasion of the SS set that is subsequent to the first SS set occasion of the SS set.

20. The method of claim 17, further comprising:
processing the WB DMRS in at least one segment during a plurality of SS set occasions of the SS set that are adjacent to the first SS set occasion of the SS set.

21. The method of claim 17, further comprising:
processing the WB DMRS in at least one segment during all of the SS set occasions of the SS set that contains the first SS set occasion within a certain time duration.

22. The method of claim 21, wherein the SS set configuration has a periodicity and the duration is at least one period of the SS set configuration periodicity.

23. The method of claim 17, wherein:
processing the WB DMRS in the first segment during the first SS set occasion comprises processing the WB DMRS based on a first precoding matrix; and
processing the WB DMRS in the second segment during the second SS set occasion comprises processing the WB DMRS based on the first precoding matrix or a second precoding matrix selected to enable the WB DMRS during the second SS set occasion to have phase continuity with the WB DMRS during the first SS set occasion.

24. The method of claim 23, further comprising:
receiving an indication of the first precoding matrix for the WB DMRS in the first segment during the first SS set occasion; and
receiving the indication of the first precoding matrix or an indication of the second precoding matrix in the second segment during the second SS set occasion.

25. The method of claim 17, further comprising:
receiving a CORESET configuration indicating that DMRS bundling is enabled for the CORESET.

26. The method of claim 17, further comprising:
receiving a SS set configuration indicating that DMRS bundling is enabled for the SS set.

27. The method of claim 17, further comprising:
processing the WB DMRS in each segment of the CORESET during each SS set occasion of each SS set associated with the CORESET.

28. The method of claim 17, further comprising:
processing the WB DMRS in each segment of a plurality of CORESETs during each SS set occasion of the SS set, wherein each of the plurality of CORESETs is associated with the SS set.

29. The method of claim 17, further comprising:
processing the WB DMRS in each segment of the CORESET during each SS set occasion of a plurality SS sets, wherein each of the plurality of SS sets is associated with the CORESET.

30. The method of claim 29, further comprising:
determining the plurality of SS sets based on at least one of configured DCI formats for the UE, the type of the SS, or an index of the SS.

* * * * *